June 23, 1942.  G. D. DUCHARME  2,287,234
TRAILER HITCH
Filed June 17, 1941   2 Sheets-Sheet 1

Inventor
GILBERT D. DUCHARME

By  Clarence A. O'Brien

Attorney

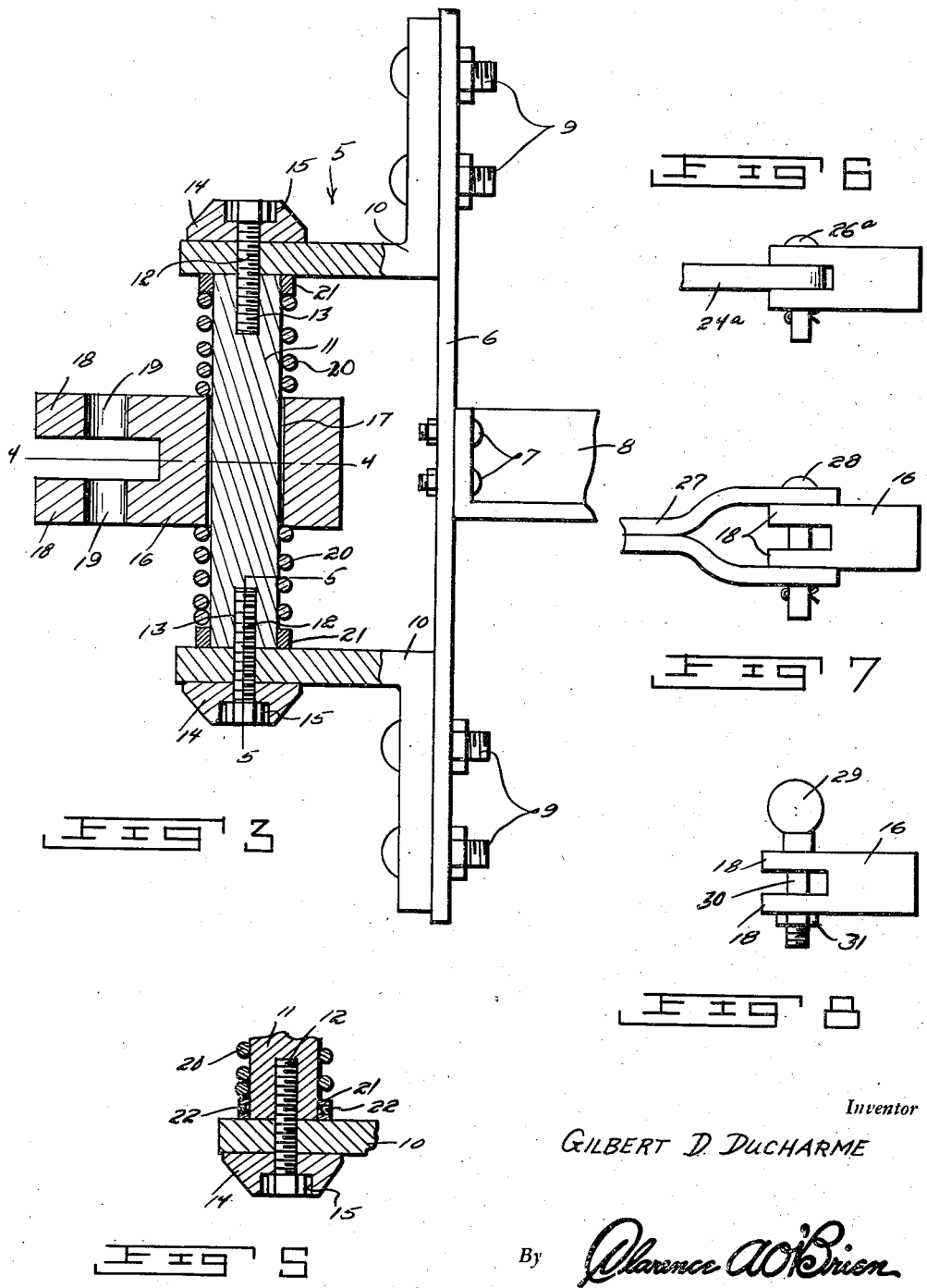

Patented June 23, 1942

2,287,234

UNITED STATES PATENT OFFICE 2,287,234

TRAILER HITCH

Gilbert D. Ducharme, Detroit, Mich.

Application June 17, 1941, Serial No. 398,470

1 Claim. (Cl. 280—33.15)

This invention relates to improvements in trailer hitches, and an object of the invention is to provide a device of this character which is extremely simple in construction and which is so equipped as to absorb jar from the trailer without transmitting the jar of the trailer vehicle to the draft vehicle.

Also, in accordance with the present invention, a trailer hitch is provided which may be readily adapted to accommodate a pin connection between the parts associated with the draft and lead vehicles, or a ball and socket connection between such parts as conditions may warrant, or otherwise found desirable.

The invention, together with its objects and advantages, will be best understood from a study of the following description taken in connection with the accompanying drawings wherein:

Figure 3 is a vertical sectional view taken substantially on the line 3—3 of Figure 1.

Figure 5 is a fragmentary vertical sectional view taken submstantially on the line 5—5 of Figure 3.

Figures 6, 7 and 8 are fragmentary side elevational views showing the several ways in which the parts of the hitch between the trailer and draft vehicles may be pivotally associated one with the other.

Figure 1:
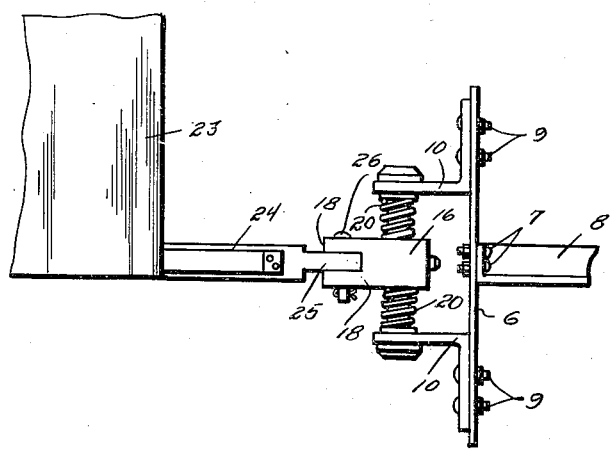
Figure 1 is a side elevational view of the trailer hitch embodying the features of the present invention and illustrating the application of the same.
Figure 2:
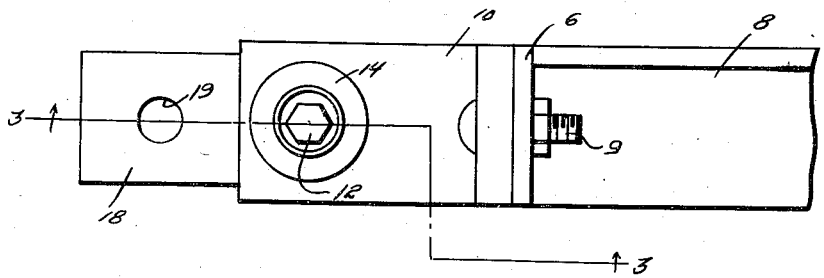
Figure 2 is a top plan view thereof.
Figure 4:
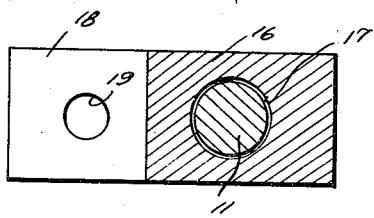
Figure 4 is a horizontal sectional view taken substantially on the line 4—4 of Figure 3.

Referring more in detail to the drawings, it will be seen that my improved hitch is indicated generally by the reference numeral 5.

In the preferred embodiment thereof the hitch 5 embodies an attaching plate 6 that is adapted to be disposed perpendicularly, and intermediate its ends bolted or otherwise secured as at 7 to the rear angle iron frame member 8, or any other suitable part of the lead vehicle.

Bolted to the plate 6 adjacent the upper and lower ends thereof, as at 9—9, are substantially L-shaped lugs 10—10.

The lugs 10 have the base partions thereof bolted as above stated as at 9 to the plate 6, while the main body portions of the lugs accommodate therebetween a vertical post 11.

The post 11 is secured in position between the lugs 10 through the medium of screws 12.

The screws 12 pass through openings provided therefor in the lugs 10 and have threaded engagement in axial threaded sockets 13 provided therefor in the respective opposite ends of the post 11, as best shown in Figures 3 and 5.

Interposed between the lugs 10 and the heads of the screws 12 are washers 14—14.

The washers 14—14 are provided with recesses or countersinks 15 that accommodate the heads of the bolts 12 as shown.

Associated with the post 11 for rotative movement about the post as an axis, and also for vertical shifting movement on the post, is a hitch block 16.

The block 16 is provided with a through opening 17 to accommodate the post 11 and at one end is bifurcated to provide a pair of coextensive ears 18—18 apertured as at 19—19.

The hitch block 10 is normally supported intermediate the upper and lower ends of the post 11 through the medium of shock-absorbing springs 20—20.

The springs 20—20 are disposed about the post 11 and respectively, at one end, impinge against the hitch block 16, and at an opposite end against a collar or washer 21.

The collars or washers 21 are disposed about the post 11 and are interposed between the lugs 10 and adjacent ends of the springs 20 as shown.

The washers 21 are secured at the desired position of adjustment on the post 11 through the medium of set screws 22—22, and obviously by adjusting the washers 21 on the post 11 the tension on the springs 20 may be adjusted as found desirable.

In Figure 1 is illustrated an application of the invention. As therein shown, the hitch 5 is mounted, as previously explained, on the frame member 8 of the draft vehicle, and in this view of the invention the trailer vehicle, indicated by the reference numeral 23, is provided with a draft tongue 24 having a reduced extension 25 that is accommodated between the ears 18—18 of the hitch block 16, and is apertured to align with the apertures 19 whereby to receive the coupling pin 26 for effecting a coupling of the draft and trailer vehicles together.

In Figure 6 a somewhat similar form of draft tongue 24a for the trailer vehicle is provided, and is connected with the draft block 16 through the medium of a pin 26a.

In Figure 7 there is shown fragmentarily the end portion of a trailer vehicle tongue, therein indicated by the reference numeral 27. In this form of the invention, the tongue 27 is shown as being forked at one end so as to straddle the ear-equipped end 18 of the hitch block 16, with the legs of the forked end of the tongue 27 apertured to align with the apertures 19 and accommodate a coupling pin 28.

In Figure 8 the hitch block is shown as equipped with a coupling ball 29. The ball 29 is provided on one end of a stem 20 that is threaded vertically through the aligned openings 19 in the ears 18 and is equipped at its lower end with a retaining nut 31.

With the block 16 thus equipped with the coupling ball 29, it will be apparent that the hitch can then be used in connection with the draft tongue of a trailer vehicle equipped with a socket at the end thereof to accommodate the ball 29.

It is believed that the construction, manner of use, and advantages of a draft hitch embodying the features of the present invention will be had without further detailed description.

It is also to be understood that while I have herein illustrated and described a preferred embodiment of the invention, it is appreciated that in practical fields minor changes from desire or expediency may be made therein without departing from the spirit of the invention as herein illustrated, described and claimed, as, for example, in actual practice it will be found that the device may be used with equal advantage in a horizontal position.

Having thus described the invention what is claimed as new is:

In a trailer hitch, an elongated plate adapted to be attached at one side thereof to a lead vehicle in upended vertical position, a pair of L-shaped brackets fixed to the other side of said plate and having horizontal arms extending laterally from the plate in vertically spaced relation, a post fitted endwise between said arms and fixed thereto, a rectangular hitch block extending lengthwise from said post and having a bored end slidably and rotatably mounted on said post and a bifurcated opposite end for connection to a trailer, a pair of coil springs sleeved onto said post intermediate said block and said arms, respectively, to exert tension against opposite sides of said block and thereby cushion sliding movement of the block in opposite directions, and means to vary the tension exerted by said springs independently.

GILBERT D. DUCHARME.